US006961804B2

(12) United States Patent
Denneau et al.

(10) Patent No.: US 6,961,804 B2
(45) Date of Patent: Nov. 1, 2005

(54) FLEXIBLE TECHNIQUES FOR ASSOCIATING CACHE MEMORIES WITH PROCESSORS AND MAIN MEMORY

(75) Inventors: Monty Montague Denneau, Brewster, NY (US); Peter Heiner Hochschild, New York, NY (US); Henry Stanley Warren, Jr., Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 10/186,476

(22) Filed: Jun. 28, 2002

(65) Prior Publication Data
US 2003/0028747 A1 Feb. 6, 2003

Related U.S. Application Data
(60) Provisional application No. 60/306,953, filed on Jul. 20, 2001.

(51) Int. Cl.[7] ............................................. G06F 12/00
(52) U.S. Cl. ........................ 711/3; 711/119; 711/130; 711/148; 711/202
(58) Field of Search ............................. 711/3, 119, 121, 711/129, 130, 147, 148, 153, 202

(56) References Cited

U.S. PATENT DOCUMENTS

| 5,848,432 A | * | 12/1998 | Hotta et al. ................. 711/131 |
| 5,987,569 A | * | 11/1999 | Takahashi et al. .......... 711/119 |
| 2002/0013877 A1 | * | 1/2002 | Naya et al. .................... 711/3 |

* cited by examiner

Primary Examiner—Kevin Verbrugge
(74) Attorney, Agent, or Firm—Ryan, Mason & Lewis, LLP; Daniel P. Morris

(57) ABSTRACT

Caches are associated with processors, such multiple caches may be associated with multiple processors. This association may be different for different main memory address ranges. The techniques of the invention are flexible, as a system designer can choose how the caches are associated with processors and main memory banks, and the association between caches, processors, and main memory banks may be changed while the multiprocessor system is operating. Cache coherence may or may not be maintained. An effective address in an illustrative embodiment comprises an interest group and an associated address. The interest group is an index into a cache vector table and an entry into the cache vector table and the associated address is used to select one of the caches. This selection can be pseudo-random. Alternatively, in some applications, the cache vector table may be eliminated, with the interest group directly encoding the subset of caches to use.

30 Claims, 4 Drawing Sheets

| Associated Address Range | Function | IG | CVT |
|---|---|---|---|
| 0 - 8191 | Stack for P0 | 0 | 0001 |
| 8192 - 12287 | Stack for P1 | 1 | 0010 |
| 12288 - 16383 | Stack for P2 | 2 | 0100 |
| 16384 - 20479 | Stack for P3 | 3 | 1000 |
| 20480 - 131071 | Area used primarily by P0 and P1 | 4 | 0011 |
| 131072 - 163479 | Area used primarily by P2 and P3 | 5 | 1100 |
| 163480 - 8384511 | Global memory (used by all processors) | 6 | 1111 |
| 8384512 - 8388607 | 4096-byte block of important constants | 7 | PID |

FIG. 3

| Effective Address Range | CVT |
|---|---|
| 0 - 8191 | 0001 |
| 8192 - 12287 | 0010 |
| 12288 - 16383 | 0100 |
| 16384 - 20479 | 1000 |
| 20480 - 131071 | 0011 |
| 131072 - 163479 | 1100 |
| 163480 - 8384511 | 1111 |
| 8384512 - 8388607 | PID |

FIG. 4

FLEXIBLE TECHNIQUES FOR ASSOCIATING CACHE MEMORIES WITH PROCESSORS AND MAIN MEMORY

CROSS REFERENCE TO RELATED APPLICATION(S)

This application claims the benefit of U.S. Provisional Application No. 60/306,953, filed Jul. 20, 2001, the disclosure of which is hereby incorporated by reference.

FIELD OF THE INVENTION

This invention relates to computer systems having multiple processors that share main memory and, more specifically, the invention relates to caches in systems having multiple processors.

BACKGROUND OF THE INVENTION

Digital computers often have a "cache memory" placed logically between the processor and main memory. A cache memory is useful because the large main memory is inevitably slow compared to the much smaller and generally faster cache memory. The cache can be placed physically closer to the processor and designed to hold, in a statistical sense, most of the data that the processor is referencing over brief periods of time.

In the case of a Symmetric MultiProcessor (SMP) system, in which a number of processors share the main memory, usually each processor has a cache and the cache is built very close to the processor with which it is associated. This makes for fast operation as long as the processors are not sharing data, but it is very awkward when they do share data. When processors share data, a "store" from one processor must somehow be communicated to other processors, which might have a copy of the data in their caches. For instance, a processor could read a variable into its cache, then perform an operation on the variable and write the new value of the variable into its cache. Other processors, with "old" copies of the variable, will not know that the value of the variable has changed unless the processor changing the data somehow communicates the change. This is called the "cache coherence" problem. Methods for solving this problem are known but will not be discussed here.

An alternative that avoids the cache coherence problem is to put the cache in the main memory, or put a separate cache in each memory bank if the main memory is divided into a number of banks. This solves the coherence problem but, in many designs, it makes the cache too far from the processor, increasing access times. For instance, a bus may separate a cache memory placed close to a processor by a small number of millimeters or even micrometers, while a main memory may be separated from a processor by a bus that is a relatively large amount of millimeters or even centimeters long. As is known in the art, in general, the longer are the metal runs making up a bus, the slower the access time to the memory. Additionally, long runs might require stronger drivers or perhaps repeaters.

Another problem with an SMP system, where each processor has a local cache, is that each cache may not be used to the same extent. For instance, one processor may only use half of its associated cache during certain times, while another processor may desire to use more than the space in its associated cache during these times. With a conventional SMP system, there is usually no way for one processor to access a cache associated with a different processor, in order to equalize cache usage. There are techniques that attempt to divide a problem amongst processors, in order to more evenly share the processor and cache loads. However, these techniques are complex, are often inexact, and might not use caches as efficiently as they could be used.

Therefore, a need still exists for associating caches with processors while avoiding, if desired, the cache coherence problem and avoiding the problems of having a cache dedicated to a single processor.

SUMMARY OF THE INVENTION

Aspects of the present invention overcome problems of conventional multiprocessor systems through flexible association of caches with processors and main memory. A single cache may be associated with one or more processors. Additionally, this association may be different for different main memory address ranges. For instance, one cache may be associated with a single processor for one main memory address range, while two caches may be associated with the single processor for another main memory address range. These techniques are flexible, as a system designer can choose how the caches are associated with processors and main memory, and the association between caches, processors, and main memory may be changed while the multiprocessor system is operating. Moreover, a multiprocessor system in accordance with the present invention may be designed to avoid cache coherence problems.

In a first aspect of the invention, an address is used to select one of a number of caches to which the address is to be routed. A signal is output that corresponds to the selected cache. One suitable signal is a cache number, although other signals are possible. There are also a variety of techniques that provide an address suitable for use with the present invention. For instance, one technique is to use an effective address, generated by a processor, as the address. Basically, ranges of effective addresses are mapped to a number of caches from which one cache is selected. In another technique, the effective address has two portions, an Interest Group (IG) and an associated address. The IG provides the number of caches from which one cache is selected. In another suitable addressing technique, the IG acts as an index into a Cache Vector Table (CVT). Entries in the CVT comprise vectors, which are used to determine, along with the associated address, to which cache the associated address is to be routed. Each vector defines the number of caches from which a single cache is selected. By changing the IG, CVT, or IG and CVT, caches are associated with processors and main memory through different configurations.

In another aspect of the invention, each processor has its own copy of the CVT. For one or more associated address ranges, two or more of the processors may have different vectors for the one or more associated address ranges of the CVT. This allows multiple caches to have copies of the same addresses, and therefore the data from these addresses, from the main memory banks. In this technique, cache coherence is not ensured. In another technique, each processor has the same vectors in the CVT. In this technique, cache coherence is ensured.

A more complete understanding of the present invention, as well as further features and advantages of the present invention, will be obtained by reference to the following detailed description and drawings.

BRIEF DESCRIPTION OF THE DRAWINGS

FIG. 3 is a table used to show an exemplary mapping of address ranges, functions, Interest Groups (IGs), and Cache Vector Table (CVT) entries, in accordance with one embodiment of the present invention; and FIG. 4 is a table used to illustrate a direct mapping from effective address to CVT entries, suitable for implementation by a CAM, in accordance with one embodiment of the present invention.

DETAILED DESCRIPTION OF PREFERRED EMBODIMENTS

The present invention applies to shared memory multiprocessors. A main idea presented herein is to have a number of caches, most likely, but not necessarily, one per processor, and to logically "decouple" the caches from both the processors and from main memory. In the illustrative embodiments to be described, the caches may be used in such a way that there is no coherence problem, and each processor may have a cache closely associated with it. Each processor may also reference the caches that are closely associated with other processors. In addition to these benefits, the invention permits clustering of processors and their closely associated caches if it is known in advance that those processors will intensely share certain areas of memory.

In other words, caches may be associated with particular processors and particular main memory address ranges. For instance, a first cache may be associated with its local processor and with a first address range. The first and a second cache may be associated with two processors, each being local to one of the first and second caches, for a second address range. By "local" it is meant that the cache may be accessed by its local processor without going through a network that can access additional caches. It is possible for a processor to have no local caches, a single local cache, or multiple local caches. A remote cache is a cache where the processor must go through a network to access the cache. A "network" is any device or devices able to interconnect a plurality of caches. Exemplary networks are described in more detail below.

Figure 1:
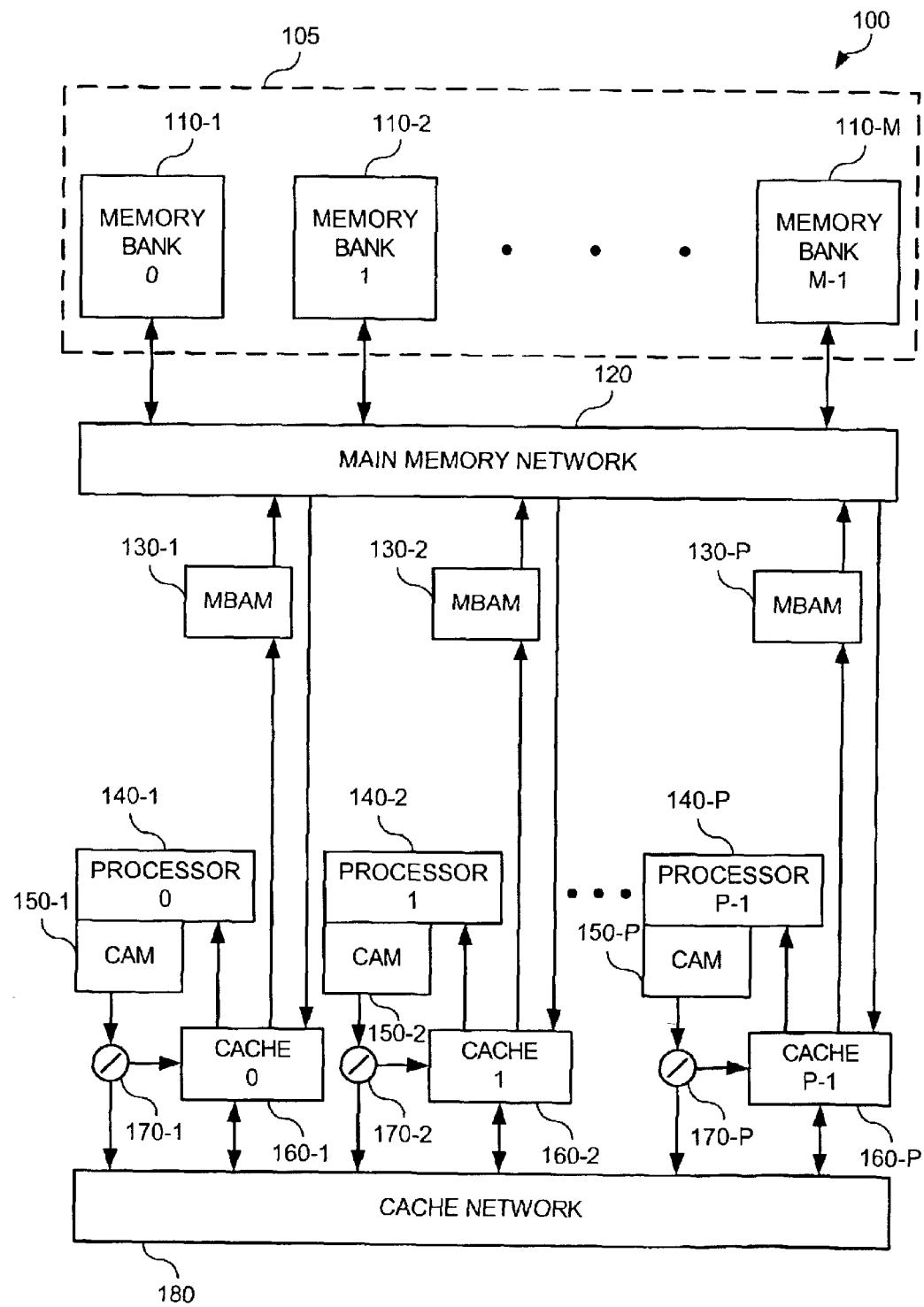
FIG. 1 is a block diagram of a Symmetric MultiProcessor (SMP) system in accordance with one embodiment of the present invention.

FIG. 1 shows a multiprocessor system 100 in accordance with the invention. The system 100 comprises processors 140-1 through 140-P that are connected to main memory 105 through caches 160-1 through 160-P and two networks, main memory network 120 and cache network 180. Main memory 105 comprises memory banks 110-1 through 110-M. Multiprocessor system 100 further comprises Memory Bank Association Maps (MBAMs) 130-1 through 130-P, Cache Association Maps (CAMs) 150-1 through 150-P, and switches 170-1 through 170-P. Generally, multiprocessor system 100 will be implemented on one chip. However, this is not necessary.

It should be noted that any device herein that is referred to by multiple numbers will have a collective shorthand notation and a singular shorthand notation. For instance, the collective shorthand notation for "processors 140-1 through 140-P" is "processors 140." The singular shorthand notation for "processors 140-1 through 140-P" is "processor 140." These shorthand notations simplify description of the present invention.

The number of memory banks 110, processors 140, and caches 160 need not be a power of two. Although FIG. 1 shows a Symmetric MultiProcessor (SMP) configuration, there is no necessary relation among the numbers of memory banks 110, processors 140, and caches 160. In an SMP configuration, the number of processors 140 equal the number of caches 160. In this disclosure, an SMP configuration is often assumed but is not required.

An "address" is used herein to select one of a number of caches to which the address is to be routed. This address is generally an effective address that comprises an "Interest Group" (IG) and an associated address. There are multiple techniques that may be used to designate the IG and associated address. Three recommended techniques are as follows:

(1) The IG indexes a Cache Vector Table (CVT). This technique allows designation any of the $2^n$ subsets of n caches. There are a large number of subsets for moderately large n (e.g., if n=128, $2^n$ is very large—a 32-digit decimal number).

(2) The IG indexes the CVT, but each CVT entry is encoded so that the entry might have only a few bits in order to encode for a restricted number of subsets of the caches. For instance, if n=128, an encoded CVT entry might have only eight bits. Such an encoding is described below, in the "VARIATIONS" section. It should be noted that the particular encoding, shown below in the VARIATIONS section, of a restricted number of subsets is for illustration only.

(3) There is no CVT, and, instead, the IG directly indicates the subset. For example, if the effective address is 32 bits, the associated address part is only 24 bits, and n=128, then the eight bits that would be in each CVT entry can instead be put directly in the effective address, as the IG.

Although the effective address techniques described briefly above (and in more detail below) are suitable for use with the present invention, any technique that can be used to associate multiple caches with multiple processors and main memory may be used. For instance, another technique is described in reference to FIGS. 3 and 4, where ranges of effective addresses are mapped to certain caches. From these caches, one particular cache is chosen to which the effective address is forwarded. What is important is that there is some mapping from an address issued by a processor to one or more caches, where a single cache is selected from the one or more caches in order for the address to be forward to a cache.

When a processor 140 executes a load or store instruction, it first generally computes an effective address as previously described. From this effective address, a CAM 150 selects a cache and outputs a signal corresponding to the selected cache. An exemplary effective address is described in more detail in reference to FIG. 2. The signal generally comprises a value indicating on which of the caches 160 the load or store instruction should be performed. However, any signal able to identify one of the caches 160 is suitable for the signal determined by a CAM 150. For the sake of simplicity, the signal determined by a CAM 150 will be referred to herein as a "cache number," although it is to be understood that the signal encompasses more than a cache number. For example, a CAM 150 could select the cache 160 that is the appropriate recipient of the instruction by the processor 140, then enable the appropriate cache through a cache enable line (not shown in FIG. 1).

The effective address comprises two portions: a first portion containing a value used to determine how many of the caches are allowed to be considered; and a second portion that contains an address, called the "associated address" herein, that defines an address in main memory. In versions of this embodiment, a CAM 150 computes the cache number based on the effective address. In one version of this embodiment, both the first and second portions are used in a certain manner, described below, to compute which cache to select. If the cache number computed by a CAM 150 is the cache 160 local to the processor 140 that originated the instruction, the local cache 160 is accessed and the load or store instruction is executed quickly (assuming the addressed data is in the cache 160). During this access, switch 170 is configured to send the associated address to the local cache.

If the cache number computed by a CAM 150 is not the cache 160 local to the originating processor 140, the cache number and the effective address are passed through cache network 180 to the cache 160 selected by the cache number. In this access, the switch 170 is configured to pass the associated address to the cache network 180. It should be noted that switch 170 may be implemented as part of CAM 150 or a cache controller, if desired. If the selected cache 160 holds the addressed data, then the load or store is executed in that cache 160. That is, if it is a load, the data is retrieved from selected cache 160 and passed back through the cache network 180 to the originating processor 140. If it is a store, the data is put in the selected cache 160 and, for some designs, an acknowledgment is passed back through cache network 180 to the originating processor 140. It should be noted that the associated address is used to determine which addressed data a cache attempts to access.

If the selected cache 160 (either local or remote) does not hold the addressed data, the selected cache 160 finds a line, which is a block of data in the cache, to "cast out," and the cache initiates a refill of the line from main memory. A cast out is performed by either writing the line back to memory or simply discarding the line it if it has not been altered. These transactions are done by computing the memory bank number, if there is more than one memory bank 110 in the system, that holds the address, and passing the write or read request through the main memory network 120 to main memory 105. The memory bank number corresponds to one of the memory banks 110. The computation of the memory bank number is performed by one of the MBAMs 130.

The transactions between the caches 160 and main memory 105 can be done by any of a number of well-known techniques and these techniques are not the subject of this invention. For example, an MBAM 130 might consist of simply selecting certain bits of an address received from a cache 160 to define the memory bank, and using the other bits of the address as an address within the memory bank. Alternatively, an MBAM 130 might consist of "scrambling" (also called "randomizing") the address received from a cache 160 to define a bank number and an address within the corresponding memory bank 110. Scrambling tends to spread out memory references evenly among the banks, which improves performance. Scrambling is used because programs often have a very uneven distribution of address references.

The cache network 180 and main memory network 120 generally do not do any computation on addresses. Instead, these networks simply route a load or store request from the source to the specifically designated destination (computed by the respective CAM 150 or MBAM 130). There are a number of well-known techniques to accomplish this, and they are not the subject of this invention. For example, either network might be a bus that is time-shared by transaction requesters, which arbitrate for the bus and are granted a time slot according to some priority scheme. Or, either network might be a "ring" of connections, and a transaction might be inserted into the ring, when a free time slot is available, and be passed around the ring from transaction server (such as a memory bank 110) to transaction server (another memory bank 110) until it reaches the addressed server (the selected memory bank 110). Still another method is to have a central non-blocking switch that connects transaction originators with servers.

Figure 2:
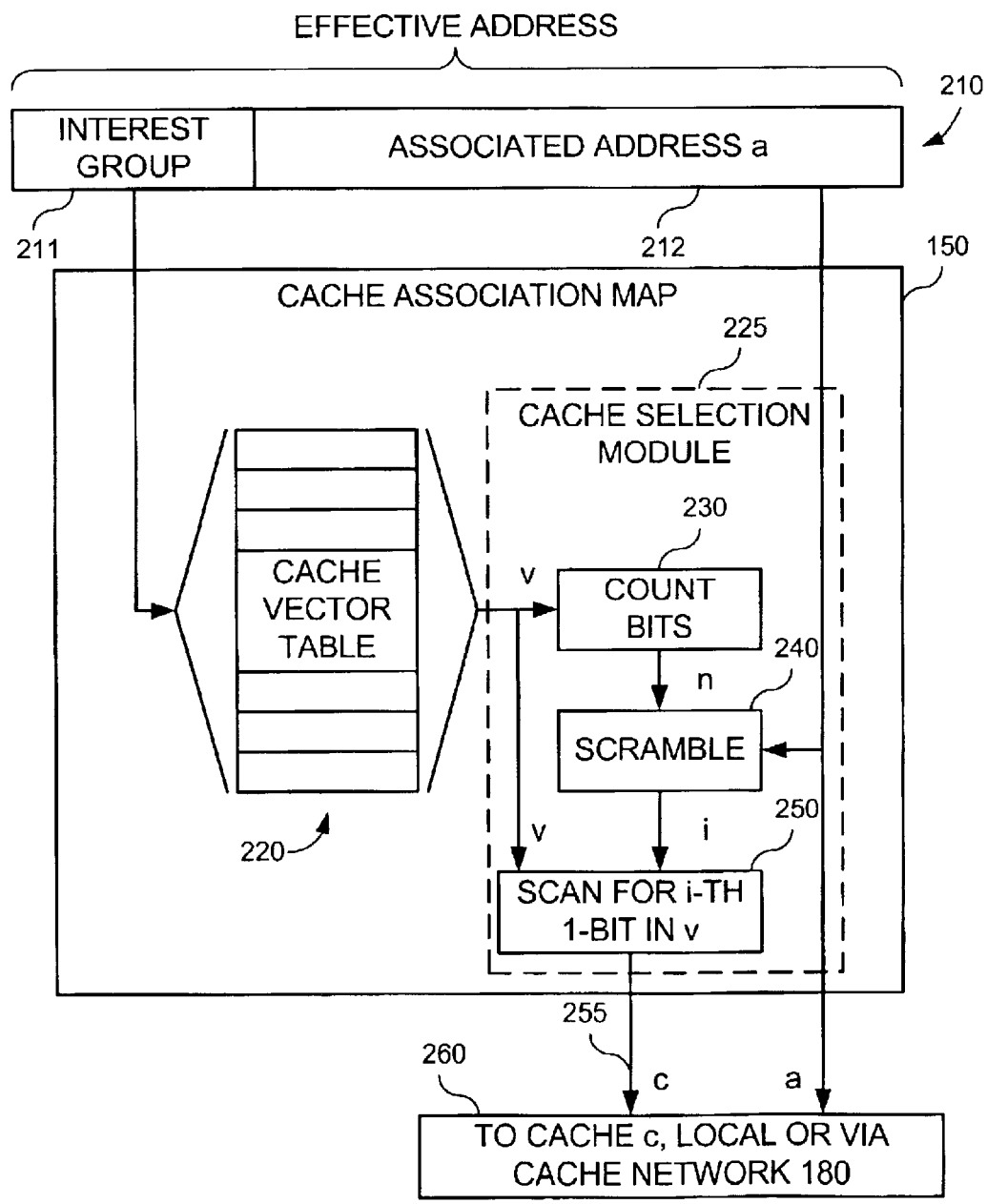
FIG. 2 is a block diagram of a Cache Association Map (CAM) accepting an effective address to calculate a cache number, in accordance with one embodiment of the present invention.

FIG. 2 shows an example of how an effective address is mapped to a cache number. This figure is basically an expansion of block CAM 150 in FIG. 1. FIG. 2 shows a CAM 150 accepting an effective address 210, producing a cache number 255, and forwarding the associated address 212 to the selected cache, c, as indicated by reference 260. It should be noted that the associated address 212 is termed as such because the combination of the IG 211 and the associated address 212 are used to select a single cache. Thus, the IG 211 and associated address 212 are "associated" in the sense that they both are used to select a single cache.

Reference 260 also shows that the cache number 255 is forwarded to the cache network 180, if necessary. CAM 150 comprises a CVT 220, and a cache selection module 225. The cache selection module 225 comprises a count bits module 230, a scramble module 240, and a scan module 250. The cache vector table comprises a number of vectors (described more completely in reference to FIG. 3), where each vector defines the caches 160 to which an address might be routed. The cache selection module uses a vector, v, and the associated address 212 (shown as a in FIG. 2) to select the cache number 255.

The areas of main memory that the program addresses are divided into IGs 211 in one technique suitable for use with the present invention. Examples of possible IGs 211 are the following: (1) the run-time stack for a given processor; (2) an array that is shared by a certain subset of the processors; and (3) "global memory," shared by all processors, not particularly heavily used. More IGs 211 may be defined for the purpose of memory protection. For example, see the section "VARIATIONS" below, which details some possible other IGs 211.

Referring still to FIG. 2, the effective address 210 is composed of two fields in this example: an IG 211, and an associated address 212. There are a number of other effective addresses 210 suitable for use with the present invention, but the effective address 210 has advantages of being relatively simple and providing, through the IG 211, a way to index a large table. The IG 211 will generally be of a few bits in length, perhaps, for instance, 4 or 8 bits, but could be large, if desired. The associated address should be large enough to address all of main memory 105 (see FIG. 1). The IG 211 indexes a table of bit vectors, referred to herein as the CVT. Each entry, containing a "vector," in the CVT has a number of bits equal to the number of caches in the system, or potentially, more if the table is used for other functions such as memory protection. For a particular entry, the bits that are "1," in one embodiment, in a vector define which caches are to be used to cache data for the IG 211 to which the entry corresponds. For example, suppose there are 12 caches in the system, and entry five of the CVT is the following binary vector: 000010010110. Let the rightmost bit represent cache 0, the next bit to the left represent cache 1, etc. Then this vector (in entry five) denotes that an IG 211 in entry five is to be cached in caches 1, 2, 4, and 7.

The cache vector v selected by the IG 211 is read from the table and the number of bits having a value of one in the vector v are counted by the count bits module 230. Alternatively, this count could be stored in the table along with each vector. The resulting count n is the number of caches over which the IG 211 is to be distributed. The number n has the range $0 \leq n < P$. The next two modules 240 and 250 select a random cache from among the n that are indicated by 1-bits in v.

In the "scramble" module 240, the address a is scrambled (also called "hashed"), in such a way that a random integer i is generated, uniformly distributed from 0 to n−1. Methods (not the subject of this invention) with very low gate counts are available to scramble an address and compress it down to any number, not necessarily a power of 2. The cache that will be selected is the $(i+1)^{th}$ one among the n that have 1-bits in v. To get the actual cache number 255, vector v is scanned from right to left to find the position of the $(i+1)^{th}$ 1-bit in v. This position, given the moniker c and being a number from 0 to P−1, is the cache number 255 to use.

Cache c is then addressed in the usual way. It is given the address a to look up. The lookup process comprises comparing the address a with tags in the cache c. A tag is a register associated with each block in the cache, that identifies the address that the block holds. If the addressed location or locations are in the cache, they are returned (e.g., for a load operation) or updated (e.g., for a store operation), and otherwise the cache replaces one of its lines from main memory. Any of the usual cache disciplines may be used, such as "store in," "store through," least recently used, or random replacement.

EXAMPLE

The table shown in FIG. 3 shows how the CVT 220 might be set up for a simple case in which there are eight IGs and four processors, each with its own local cache (i.e., an SMP configuration). The associated address range for each IG is shown in the first column, and the function of each IG is shown in the second column. The IG numbers are simply assigned sequentially in this example. The last column shows the contents of the CVT.

As indicated by this table, the run-time stack for processor 0 is to be 8 KiloBytes (KB) in size. Since the data in this stack is used almost exclusively by processor 0, the CVT entry has only the bit for processor/cache 0 set. Any processor may reference this stack, but all references must use Interest Group 0 and an address in the range 0 to 8191. Thus, processor 0 may pass pointers to its stack data to other processors. Provided they all refer to it with IG=0, there is no aliasing (i.e., the stack data will never appear in the local cache of any other processor).

The next three IGs are for the stacks for processors 1, 2, and 3. These stacks are 4 KB in size. The CVT for these indicates that the data should be cached in the local cache for the processor.

The next IG, IG 4, is for data that is heavily shared by processors 0 and 1, and referenced little or not at all by the other processors. The CVT entry (0011) indicates that this data is to be cached in cache 0 or 1, randomly selected for each cache line. References to this data by processors 0 and 1 will find the data in their own cache half the time, and these references will not interfere with the local caches of other processors.

IG 5 is similar to IG 4, but for processors 2 and 3.

The next IG, IG 6, is for "global memory." In this example, nearly all of the 8 MegaByte (MB) main memory is in this IG. This data may be stored in any of the four caches, selected randomly.

It should be noted that all IGs 1 through 7 should maintain cache coherence, as there will be no single main memory address and the data associated therewith that is stored in more than one cache.

The last Interest Group (7) is different from the others in that it employs "aliasing," which means the data at a particular address in main memory may appear in more than one cache. Aliasing is usually an undesirable feature, to be avoided if the hardware allows it, as it might cause a cache coherence problem. But it can be used to advantage if used with care, and IG 7 illustrates one such situation.

IG 7 is for frequently referenced constants. It is assumed that each processor has its own copy of the CVT. For IG 7, the CVT entry for each processor has a vector that has a single bit on, namely that of the Processor IDentification (PID) of the owning processor. Thus, if processor i references IG 7, the data gets brought into the local cache for processor i. Different processors have copies of the data in their own caches. There is no coherence problem because the constants are read-only.

Aliasing can also be used for variables. For example, during a certain phase of the computations of a program, an area may be used by only one of the processors, so an IG may be defined for it that allows the data to be only in the local cache for that processor. Later, in another phase, the data may be shared globally and it might be desirable to have it spread out over all the caches. To accomplish this, between phases, the program would have to write back to main memory all the blocks of its cache that contain the Interest Group, invalidate those blocks of its cache, and then change the CVT entry for that Interest Group in all the processors.

What this means is that it is possible to have different cache, processor, and main memory associations during execution of program. Real-time changes made be made with embodiments of the present invention.

FIG. 3 also illustrates another possible addressing technique. Assume that the associated address shown in FIG. 3 is an effective address and that no IG exists. What results is the table shown in FIG. 4. What the table in FIG. 4 shows is that a device, generally external to a processor, can map a range of effective addresses to a CVT entry, which contains a predetermined number of caches associated with the effective address ranges. A CAM can then determine, using a specific effective address passed to it and the CVT entry in the table shown in FIG. 4, a single cache to which the effective address should be routed. In fact, a CAM is a suitable device that could contain the table shown in FIG. 4 and use the table to convert an effective address into a CVT entry. As shown in FIGS. 2 and 4, the CVT 220 in the CAM 150 could be the table shown in FIG. 4, and the CAM 150 adapted to contain suitable circuitry for using the table to convert an effective address into a CVT entry.

Consider, for instance, a system that has 24 bits of addressing, to the byte, and has a block size of 1024 bytes for the purposes of mapping an address to a subset of the caches. Then the number of entries in a big table is $(2^{24})/1024$, which is 16K. It is within the realm of possibility to have a table with 16K entries, each of which identifies (by some encoding—not necessarily the CVT encoding described above) a particular subset of caches to use.

ADDITIONAL VARIATIONS

In the descriptions of FIG. 1, it has been assumed that the address a generated by the processor is essentially a real, physical address, except that an MBAM 130 (see FIG. 1) selects the memory bank that holds the address. However, in many computers, the processor generates a "virtual address," which is in an address space much larger than the real address space. In some computers, the effective address is the same as the virtual address, and, in others, there is a translation that expands the effective address into a virtual address.

Another distinction among computer designs is that some have a "virtually addressed" cache and some a "physically addressed" cache. In the former, the virtual address is fed to the cache, and the cache has virtual addresses in its tags. In the latter, the virtual address is first mapped down to a real address, and the real address is fed to the cache, which holds real addresses in its tags.

For these systems, FIG. 1 applies if it is assumed that the processor generates virtual addresses. The first translation, if any, is in the processor, and is not shown in FIG. 1. For a virtually addressed cache, a MBAM 130 could then be a more complex mapping that would map virtual to real, as well as select the memory bank. For a physically addressed cache, CAM 150 could do the virtual to real mapping.

The CVT structure described above is suitable for a system that includes a fairly small number of caches, but it does not scale well to a large number of caches. If n is the number of caches, then the CVT is n bits wide by at least n entries, if it is assumed that a typical application would employ n entries with a single "on" bit, plus one with all bits on (the "global" Interest Group), plus a few more for special purposes. Thus the size of the CVT is a little larger than $n^2$ bits. For large n, this would take excessive chip area.

Various schemes can be devised to reduce the size of the CVT by reducing the number of subsets of caches that it is possible to specify. One scheme is to restrict the subsets to those having a size (number of caches) that is a power of 2, and whose subsets are a sequential sequence of caches beginning with a cache whose ID number is a power of 2. Thus, one can specify any subset of size one (any one cache), a subset of size 2 provided the two caches are an even/odd pair, etc. For example, suppose n=128. Then the subsets can be encoded quite compactly as illustrated below.

| encoding | subset size |
|---|---|
| sssssss1 | 1 |
| ssssss10 | 2 |
| sssss100 | 4 |
| ssss1000 | 8 |
| sss10000 | 16 |
| ss100000 | 32 |
| s1000000 | 64 |
| 10000000 | 128 |

In this encoding, the position of the first 1-bit encountered from the right identifies the size of the subsets, and the bits shown as "s" above identify a particular subset of that size. The first row encodes subsets of size 1, and the seven s-bits are a binary integer identifying the particular one of the 128 subsets of size 1. The second row encodes subsets of size 2, and the six s-bits, with a 0 appended on the right, identify the number of the first cache of the even/odd pair. The last entry encodes the subset consisting of all 128 caches. A CVT entry of value binary 01011000 denotes the eight caches starting with cache number 5 ×8=40, i.e., the subset consisting of caches 40, 41, 42, . . . , 47.

With this encoding, the size of the CVT table is slightly more than $n(\log_2 n+1)$ bits, where n is the number of caches. This scales reasonably well for a large number of caches. For n=128, the first, completely general, method requires slightly more than $128^2$=16,384 bits, whereas the second, restricted method requires slightly more than $128(\log_2 128+1)$=1024 bits.

If the more compact, but restricted, encoding is acceptable, it may be possible to put the subset specification directly in the effective address, eliminating the CVT. Thus, the IG will have all the required bits.

The CVT also provides a convenient place to hold memory protection bits. This is because all the locations in an IG would probably be in the same memory protection class. Thus, a few bits in each vector could represent such memory protection states as read only, read/write, execute only, or other memory protection states.

Another form of protection that might be desirable is to put the address range of each interest group in the CVT, as two addresses. The hardware could check each reference to ensure that the address a is in range for the IG used, and interrupt if an address is out of range. If the software does not want to use aliasing, this would prevent it. And, it allows aliasing that is intentional for the purpose of having certain data reside in multiple caches.

It has been assumed that each processor has its own logic circuits and table (i.e., CVT) that implement a CAM 150. Although a system could have just one copy of a CAM 150 that is shared by all the processors, in practice probably each processor would have its own. This is to reduce circuit delays and for fast, no-interference access of the CVT. It is also necessary to have multiple CVTs if they have different contents, as they would if aliasing is employed, which allows the same data from the same main memory address to be in multiple caches. But the existence of multiple copies of the CVT presents a problem if shared IGs are to be assigned dynamically. When a new IG is created, or an existing IG is altered so that its data occupy a different set of caches, then the CVT entries in all the processors must be changed in a coordinated way.

For the two encodings of CVT entries discussed here, an all-zero value is unused. A processor could use this value to denote "non-cacheable." This is useful for an application that randomly probes a large array, as it prevents casting out a cache line for a word that will probably be referenced only once. Implementing this might require additional data paths, not shown in FIG. 1, that go directly to and from each processor to main memory network 120.

It should be noted that the IG could be placed on the right side of the effective address, as opposed to the left side, as depicted in FIG. 2. As additional examples, module 250 could easily be changed to scan from left to right for the (n−i)-th bit instead of from right to left for the (i+1)-th bit; the module 240 could be made to output (n−i) instead of i. Other modifications will be apparent to those skilled in the art.

It is to be understood that the embodiments and variations shown and described herein are merely illustrative of the principles of this invention and that various modifications may be implemented by those skilled in the art without departing from the scope and spirit of the invention.

What is claimed is:

1. A method, comprising:

selecting, by using at least a portion of an address, one cache of a plurality of caches to which the address is to be routed, wherein the address is an effective address computed by a processor and wherein the effective address comprises an interest group and an associated address; and outputting a signal corresponding to the selected cache.

2. The method of claim 1, wherein the signal comprises a value corresponding to the selected cache.

3. The method of claim 1, further comprising the step of routing the address to the selected cache.

4. The method of claim 1, further comprising the step of mapping the effective address to the plurality of caches, thereby determining the plurality of caches.

5. The method of claim 1, wherein the interest group identifies the plurality of caches, which is a subset of a total number of caches.

6. The method of claim 5, wherein the step of selecting further comprises the step of selecting one of the plurality of caches by using the associated address.

7. The method of claim 1, wherein the plurality of caches is defined through a vector, wherein a plurality of vectors are stored in a cache vector table, and wherein the method further comprises the step of using an interest group portion of the address as an index into the cache vector table to select a vector in the cache vector table, thereby identifying the plurality of caches.

8. The method of claim 7, wherein the step of selecting one of the plurality of caches by using the associated address further comprises the steps of:
    using a number of caches identified by a vector and an associated address in a portion of the address to determine an integer; and
    using the integer to select a bit having a first predetermined value from the vector, wherein each bit in the vector corresponds to a cache in a system and wherein each cache of the plurality of caches has the first predetermined value and each cache not associated with the plurality of caches has a second predetermined value.

9. The method of claim 8, wherein the first predetermined value is a one and the second predetermined value is a zero, whereby the step of using the integer selects a bit having a value of one.

10. The method of claim 7, wherein there are multiple copies of the cache vector table, each cache vector table comprising a predetermined number of vectors, and wherein each vector at a single entry of the cache vector tables is the same as the vector at the single entry of another of the cache vector tables, wherein all cache vector tables are the same, whereby cache coherence is ensured.

11. The method of claim 7, wherein there are multiple copies of the cache vector table, each cache vector table comprising a predetermined number of vectors, and wherein one or more vectors in one of the cache vector tables is different from the vectors at corresponding entries in another of the cache vector tables, whereby cache coherence is not ensured.

12. The method of claim 1, wherein the plurality of caches is represented as an encoded value in a portion of the address, wherein a part of the encoded value identifies a size of subsets of the plurality of caches and zero or more bits represent a particular subset of the size.

13. The method of claim 12, wherein the part of the encoded value is a number of trailing bits having a predetermined value.

14. The method of claim 13, wherein the predetermined value is zero, whereby the number of trailing bits having a zero value identifies the size of the subsets.

15. An apparatus comprising:
    a cache selection module adapted to determine a cache number from a vector and an address, the cache number indicating which of a plurality of caches is selected, the vector indicating to which of one or more of the caches an address may be routed.

16. The apparatus of claim 15, wherein the cache selection module further comprises:
    a first module adapted to scramble the associated address to determine an integer; and
    a second module, coupled to the first module, that uses the integer to select one of the caches indicated by the vector.

17. The apparatus of claim 16, wherein each vector comprises a plurality of bits, each bit corresponding to one of the plurality of caches, wherein the cache selection module further comprises a third module, coupled to the first module, adapted to count how many bits in the vector are a first value, and wherein the first module is adapted to ensure that the integer is zero or larger and smaller than the count, and wherein the second module is further adapted to select, by using the integer, a single bit of the bits having the first value in the vector.

18. The apparatus of claim 16, wherein the cache selection module further comprises a cache vector table comprising a plurality of entries, each entry comprising a vector.

19. The apparatus of claim 15, wherein the address is an effective address computed by a processor, and wherein the apparatus further comprises a cache association map, the cache association map comprising the cache selection module, the cache association map further comprising a map mapping ranges of effective addresses to vectors, the cache association map adapted to select a vector for an effective address and couple the vector to the cache selection module.

20. The apparatus of claim 15, further comprising a cache vector table coupled to the cache selection module and comprising a plurality of vectors.

21. The apparatus of claim 15, wherein the cache selection module is part of a map capable of associating a cache with an effective address, and wherein the apparatus further comprises:
    a plurality of caches interconnected through a network;
    a plurality of processors, wherein the caches are between the processors and the network, but wherein a number of caches does not have to equal a number of processors; and
    a plurality of the maps, each of the plurality of maps coupled to one of the processors.

22. A system comprising:
    a first plurality of processors, each of the processors adapted to compute an effective address;
    a second plurality of caches coupled to the processors through a network;
    one or more cache association maps coupled to the processors and the caches, each cache association map adapted to select, from an effective address computed by one of the processors, one cache of the plurality of caches and to output a signal corresponding to the selected cache;
    the network, wherein the network is adapted to route at least a portion of the effective address to the selected cache when a cache association map couples the portion of the effective address to the network; and
    a main memory coupled to the caches.

23. The apparatus of claim 22, wherein a number of the plurality of caches and a number of the plurality of processors are the same.

24. The apparatus of claim 22, wherein a number of the plurality of caches and a number of the plurality of processors are not the same.

25. The apparatus of claim 22, wherein there are a plurality of cache association maps, wherein each cache association map comprises a cache vector table comprising a plurality of entries, each entry having a vector.

26. The apparatus of claim 25, wherein each of the cache vector tables is the same, whereby cache coherence is ensured.

27. The apparatus of claim 25, wherein one or more vectors in one of the cache vector tables is different from the vectors at the corresponding entries in another of the cache vector tables, whereby cache coherence is not ensured.

28. The apparatus of claim 22, wherein the main memory is coupled to the processors.

29. The apparatus of claim 22, wherein the main memory comprises a plurality of memory banks.

30. The apparatus of claim 29, further comprising a plurality of memory bank association maps between the caches and the main memory, each memory bank association map selecting one or more of the banks of memory when a respective cache addresses main memory.

* * * * *